(12) United States Patent
Jeon

(10) Patent No.: US 7,815,544 B2
(45) Date of Patent: Oct. 19, 2010

(54) METHOD AND SYSTEM FOR RELEASING HYDRAULIC PRESSURE OF AUTOMATIC TRANSMISSION

(75) Inventor: Byeong Wook Jeon, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 291 days.

(21) Appl. No.: 12/172,016

(22) Filed: Jul. 11, 2008

(65) Prior Publication Data

US 2009/0156357 A1    Jun. 18, 2009

(30) Foreign Application Priority Data

Dec. 13, 2007    (KR) ...................... 10-2007-0130414

(51) Int. Cl.
*F16H 59/00*    (2006.01)
(52) U.S. Cl. ........................................................ 477/98
(58) Field of Classification Search .................... 477/98
See application file for complete search history.

(56) References Cited

U.S. PATENT DOCUMENTS

| | | | |
|---|---|---|---|
| 5,293,789 A * | 3/1994 | Goto et al. ................. | 477/151 |
| 5,611,752 A * | 3/1997 | Kamada et al. ............... | 477/98 |
| 7,128,688 B2 * | 10/2006 | Katou .......................... | 477/98 |
| 7,264,572 B2 * | 9/2007 | Jeon ............................ | 477/98 |
| 2003/0233185 A1 * | 12/2003 | Takebayashi et al. ......... | 701/55 |

FOREIGN PATENT DOCUMENTS

| JP | 61-153045 | 7/1986 |
|---|---|---|
| JP | 07-208599 | 8/1995 |
| KR | 10-0387814 B1 | 6/2003 |

\* cited by examiner

*Primary Examiner*—Dirk Wright
(74) *Attorney, Agent, or Firm*—Morgan, Lewis & Bockius LLP

(57) ABSTRACT

The present invention relates to a method and a system for releasing hydraulic pressure of an automatic transmission that improve shift responsiveness and stability of hydraulic pressure control as a consequence of quickly supplying to a pressure control valve as feedback pressure a part of operating pressure that is supplied from the pressure control valve to an off-going element in a case of releasing the off-going element. The method for releasing hydraulic pressure of an automatic transmission according to an exemplary embodiment of the present invention may include: determining whether a shift signal is detected; calculating a delay time $T_{PSW}$ according to oil temperature; maintaining a control duty at 0% during the delay time; and recovering the control duty to a release duty $D_R$ after the delay time has passed.

8 Claims, 5 Drawing Sheets

METHOD AND SYSTEM FOR RELEASING HYDRAULIC PRESSURE OF AUTOMATIC TRANSMISSION

CROSS-REFERENCE TO RELATED APPLICATION

This application claims priority to and the benefit of Korean Patent Application No. 10-2007-0130414 filed in the Korean Intellectual Property Office on Dec. 13, 2007, the entire contents of which are incorporated herein by reference.

BACKGROUND OF THE INVENTION (a) Field of the Invention

The present invention relates to a shift control method of an automatic transmission, and a system thereof. More particularly, the present invention relates to a method and a system for releasing hydraulic pressure of an automatic transmission that improve shift responsiveness and stability of hydraulic pressure control as a consequence of quickly supplying, to a pressure control valve as feedback pressure, a part of operating pressure that is supplied from the pressure control valve to an off-going element in a case of releasing the off-going element.

(b) Description of the Related Art

An automatic transmission controls a hydraulic pressure by operating at least one solenoid valve according to a driving state, such as a vehicle speed and a throttle opening, in order to perform shifting to a target shift speed.

In a case in which the shifting to the target shift speed is performed, an automatic transmission has an off-going element that changes from an engaged state to a released state and an on-coming element that changes from a released state to an engaged state. Releasing an off-going element and engaging an on-coming element is realized by controlling hydraulic pressure supplied to respective elements.

In addition, the control of the hydraulic pressure supplied to the off-going and on-coming elements is performed by operating a control duty and controlling the solenoid valve according to the control duty.

That is, the solenoid valve supplies hydraulic pressure corresponding to the control duty to a pressure control valve, and the pressure control valve controls the hydraulic pressure transmitted from the solenoid valve and supplies it to the on-coming element or the off-going elements.

In addition, a pressure switch valve is used such that the pressure control valve does not operate too sensitively. In this case, control of the off-going element begins after hydraulic lines in the pressure switch valve are converted by the hydraulic pressure supplied to the pressure switch valve through the pressure control valve. Therefore, release response may be retarded and off-going pressure may change as a consequence of local change in flux in a case that the hydraulic lines in the pressure switch valve are converted.

If the release of the hydraulic pressure is retarded, release control of the off-going element in shift process may be retarded and thereby shift response may also be retarded. In addition, if undershoot of the off-going pressure occurs, the off-going element may be released instantaneously and blow-up of turbine speed may occur.

As shown in FIG. 6, if a shift signal is detected, a transmission control unit reduces control duty of a solenoid valve to release duty $D_R$ by a constant slope and maintains the control duty as the release duty $D_R$. After that, the transmission control unit reduces the control duty of the solenoid valve to 0%.

At this time, release response may be retarded and the hydraulic pressure may change unstably because of conversion of the hydraulic lines in the pressure switch.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention have been made in an effort to provide a method and a system for releasing hydraulic pressure of an automatic transmission having advantages of improved shift responsiveness and stability of hydraulic pressure control as a consequence of quickly supplying, to a pressure control valve as feedback pressure, a part of operating pressure that is supplied from the pressure control valve to an off-going element in a case of releasing the off-going element.

In one exemplary embodiment of the present invention, a method for releasing hydraulic pressure of an automatic transmission, may comprise: determining whether a shift signal is detected, calculating a delay time $T_{PSW}$ according to oil temperature, maintaining a control duty at 0% during the delay time, and recovering the control duty to a release duty $D_R$ after the delay time has passed.

The method may further comprise: reducing the control duty to 0% according to a predetermined control pattern after step of recovering the control duty to the release duty $D_R$ after the delay time has passed.

The delay time may be predetermined as a function of the oil temperature.

In another exemplary embodiment of the present invention, a system for releasing hydraulic pressure of an automatic transmission, may comprise: a detecting module detecting vehicle speed, throttle opening, turbine speed, and oil temperature in a transmission, a transmission control unit generating a control duty based on the detected values transmitted from the detecting module, and calculating a delay time according to the oil temperature, a solenoid valve generating a control pressure according to the control duty of the transmission control unit, a pressure control valve controlled by the control pressure of the solenoid valve and a feedback pressure opposing thereto, and supplying an operating pressure, a pressure switch valve controlled by the control pressure of the solenoid valve and a reducing pressure opposing thereto, and supplying a part of the operating pressure transmitted from the pressure control valve back to the pressure control valve as the feedback pressure, and a switch valve supplying the operating pressure transmitted from the pressure control valve to an off-going element.

The transmission control unit may decrease quickly the control duty to 0% when a shift signal is detected, and maintains the control duty at 0% during a delay time.

The transmission control unit may recover the control duty to a release duty after the delay time has passed.

The transmission control unit may reduce the control duty to 0% according to a predetermined control pattern after recovering the control duty to the release duty $D_R$ after the delay time has passed.

The delay time may be predetermined as a function of the oil temperature.

DETAILED DESCRIPTION OF THE EMBODIMENTS

An exemplary embodiment of the present invention will hereinafter be described in detail with reference to the accompanying drawings.

Figure 1:
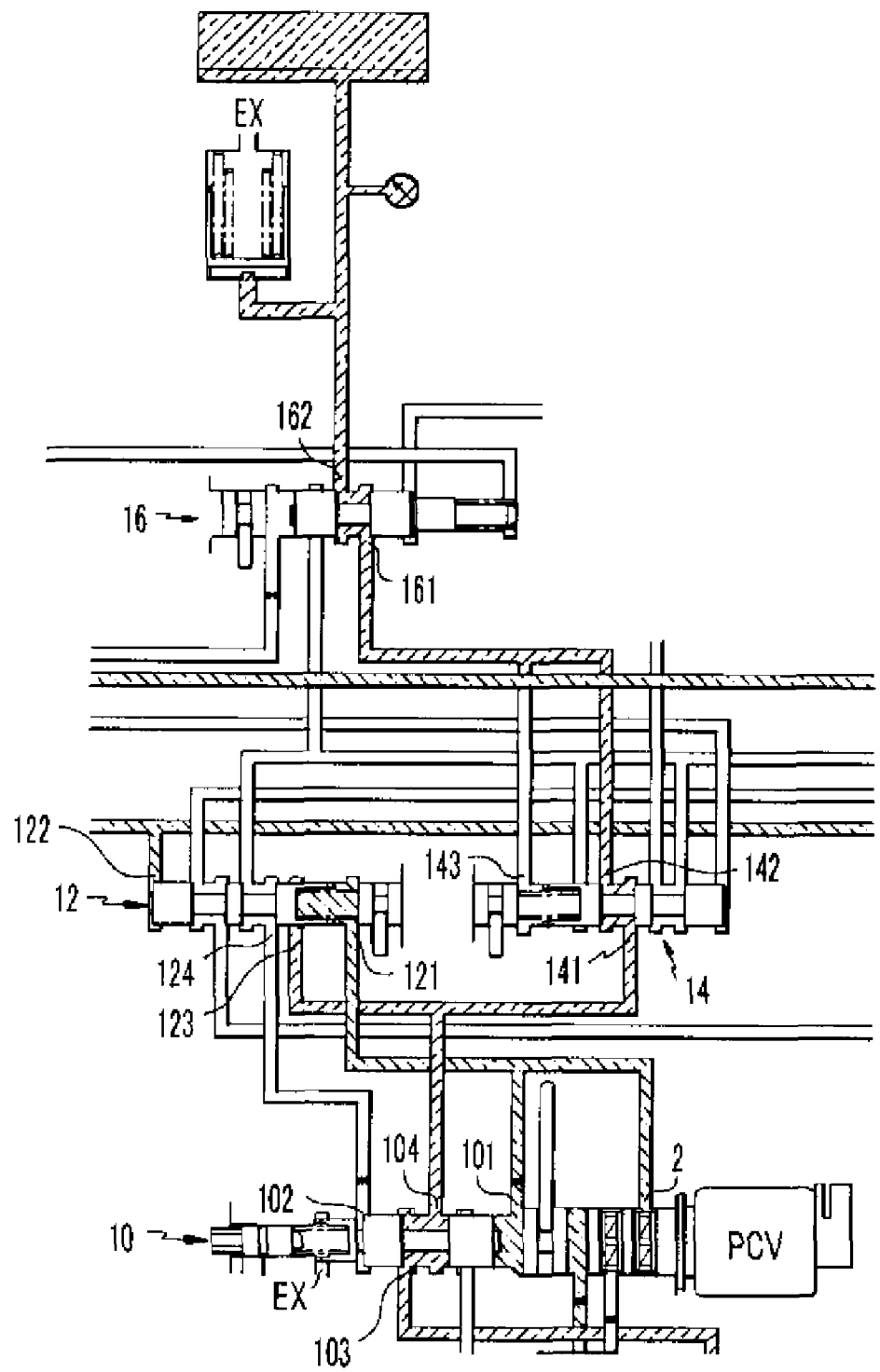
FIG. 1 is a schematic diagram of a hydraulic circuit applicable to a method for releasing hydraulic pressure of an automatic transmission according to an exemplary embodiment of the present invention.

FIG. 1 is a schematic diagram of a hydraulic circuit applicable to a method for releasing hydraulic pressure of an automatic transmission according to an exemplary embodiment of the present invention.

For better comprehension and ease of description, a part of a hydraulic circuit related to a method for releasing hydraulic pressure of an automatic transmission according to an exemplary embodiment of the present invention will be described.

As shown in FIG. 1, the hydraulic circuit applicable to the method for releasing hydraulic pressure of an automatic transmission according to an exemplary embodiment of the present invention includes a solenoid valve PCV, a pressure control valve 10, a pressure switch valve 12, a switch valve 14, and a fail-safe valve 16.

The solenoid valve PCV generates control pressure corresponding to control duty and supplies the control pressure to the pressure control valve 10 and the pressure switch valve 12 through an outlet port 2.

The pressure control valve 10 includes a first port 101 receiving the control pressure from the solenoid valve PCV, a second port 102 receiving feedback pressure standing against the control pressure as control pressure thereof, a third port 103 receiving line pressure or forward pressure as operating pressure of an off-going element, and a fourth port 104 supplying the operating pressure received from the third port 103 to the pressure switch valve 12 and the switch valve 14. Therefore, hydraulic lines in the pressure control valve 10 are conversed by the control pressure of the solenoid valve PCV and the feedback pressure, and the operating pressure is selectively supplied to the pressure switch valve 12 and the switch valve 14.

The pressure switch valve 12 includes a first port 121 receiving the control pressure from the outlet port 2 of the solenoid valve PCV, a second port 122 receiving reducing pressure standing against the control pressure as control pressure thereof, a third port 123 selectively communicated with the fourth port 104 of the pressure control valve 10 so as to receive the operating pressure, and a fourth port 124 selectively communicated with the third port 123 such that a part of the operating pressure is selectively supplied to the second port 102 of the pressure control valve 10 as the feedback pressure. Generally, the reducing pressure is supplied from a reducing valve (not shown). Therefore, hydraulic lines in the pressure control valve 12 are conversed by the control pressure of the solenoid valve PCV and the reducing pressure, and the part of the operating pressure is selectively supplied to the pressure control valve 10 as the feedback pressure.

The switch valve 14 includes a first port 141 communicated with the fourth port 104 of the pressure control valve 10 so as to receive the operating pressure, a second port 142 supplying the operating pressure received from the first port 141 to the fail-safe valve 16, and a third port 143 receiving a part of the operating pressure supplied to the fail-safe valve 16 as control pressure thereof. Therefore, the switch valve 14 supplies the operating pressure received from the pressure control valve 10 to the fail-safe valve 16.

The fail-safe valve 16 relays the operating pressure supplied from the switch valve 14 to an off-going element when the hydraulic circuit operates normally. However, the fail-safe valve 16 cuts off hydraulic line from the switch valve 14 to the off-going element when the hydraulic circuit does not operate normally. The fail-safe valve 16 includes a first port 161 receiving the operating pressure from the switch valve 14 and a second port 162 supplying the operating pressure of the first port 161 to the off-going element.

Here, the operating pressure of the switch valve 14 is supplied to the off-going element through the fail-safe valve 16, but the operating pressure may be directly supplied from the switch valve 14 to the off-going element without the fail-safe valve 16.

Figure 2:
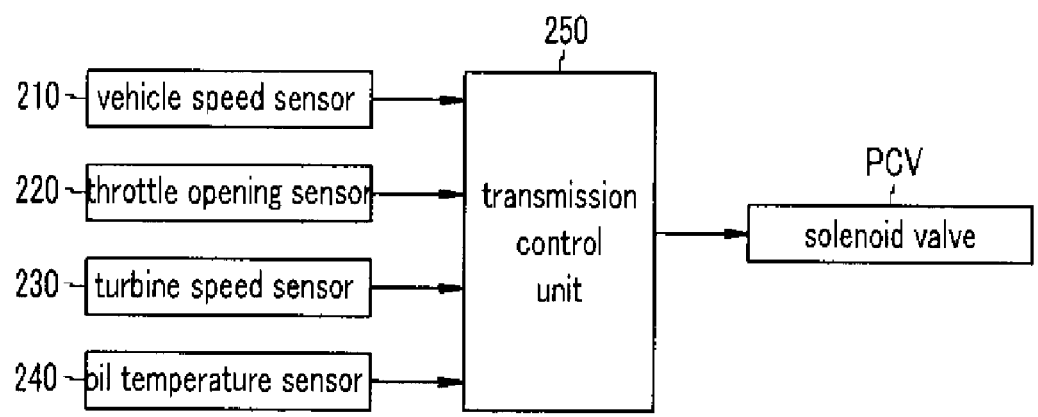
FIG. 2 is a schematic diagram of a system for releasing hydraulic pressure of an automatic transmission according to an exemplary embodiment of the present invention.

FIG. 2 is a schematic diagram of a system for releasing hydraulic pressure of an automatic transmission according to an exemplary embodiment of the present invention.

As shown in FIG. 2, a system for releasing hydraulic pressure of an automatic transmission according to an exemplary embodiment of the present invention includes a vehicle speed sensor 210, a throttle opening sensor 220, a turbine speed sensor 230, an oil temperature sensor 240, a transmission control unit 250, and the solenoid valve PCV.

The vehicle speed sensor 210 detects vehicle speed, and transmits a signal corresponding thereto to the transmission control unit 250.

The throttle opening sensor 220 detects change in opening of a throttle valve that acts according to operation of an accelerator pedal, and transmits a signal corresponding thereto to the transmission control unit 250.

The turbine speed sensor 230 detects current turbine speed from the phase angle of a crankshaft that operates as input torque of the transmission, and transmits a signal corresponding thereto to the transmission control unit 250.

The oil temperature sensor 240 detects oil temperature in the automatic transmission, and transmits a signal corresponding thereto to the transmission control unit 250.

The transmission control unit 250 can be realized by one or more processors activated by a predetermined program, and the predetermined program can be programmed to perform each step of a method for releasing hydraulic pressure of an automatic transmission according to an embodiment of this invention.

The transmission control unit 250 receives the signals corresponding to the vehicle speed, the throttle opening, the turbine speed, and the oil temperature respectively from the vehicle speed sensor 210, the throttle opening sensor 220, the turbine speed sensor 230, and the oil temperature sensor 240.

In addition, the transmission control unit 250 generates the control duty corresponding to the signals and transmits the control duty to the solenoid valve PCV. The control duty is set as a map and is stored in the transmission control unit 250.

The solenoid valve PCV receives the control duty from the transmission control unit 250 and controls the hydraulic pressure supplied to the off-going element.

Hereinafter, the method for releasing hydraulic pressure of an automatic transmission according to an exemplary embodiment of the present invention will be described in detail with reference to FIG. 3.

Figure 3:
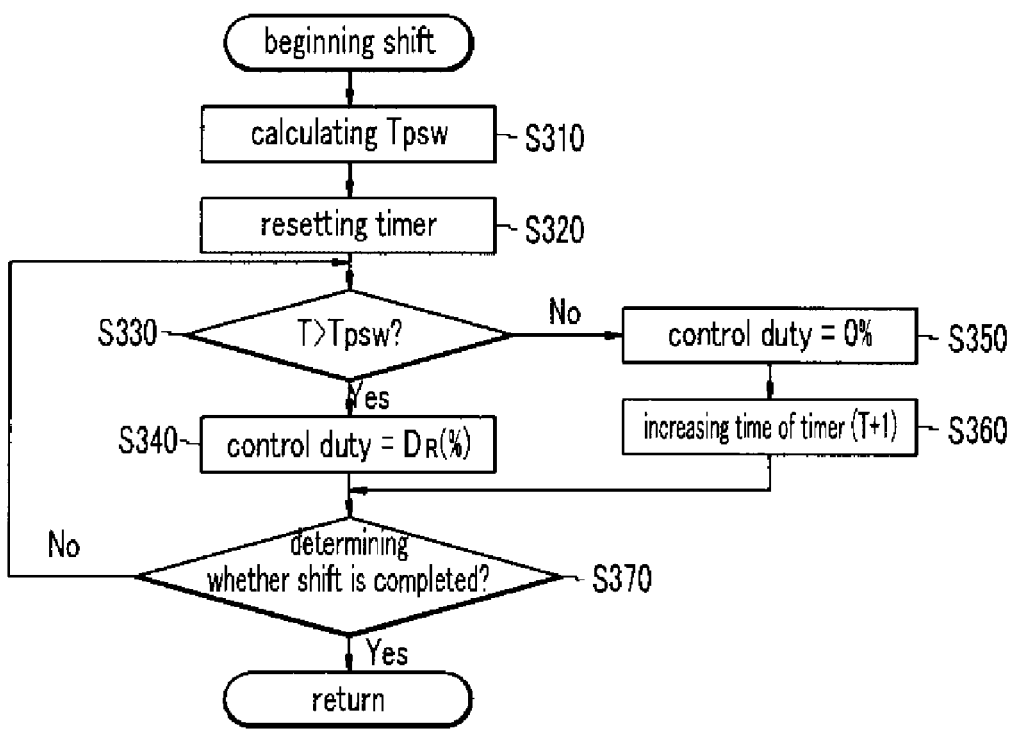
FIG. 3 is a flowchart of a method for releasing hydraulic pressure of an automatic transmission according to an exemplary embodiment of the present invention.

FIG. 3 is a flowchart of a method for releasing hydraulic pressure of an automatic transmission according to an exemplary embodiment of the present invention.

Figure 5:
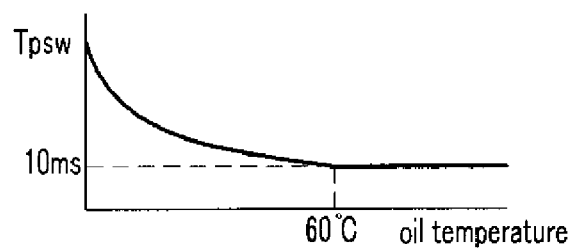
FIG. 5 is one example of a map showing a delay time according to oil temperature.
Figure 6:
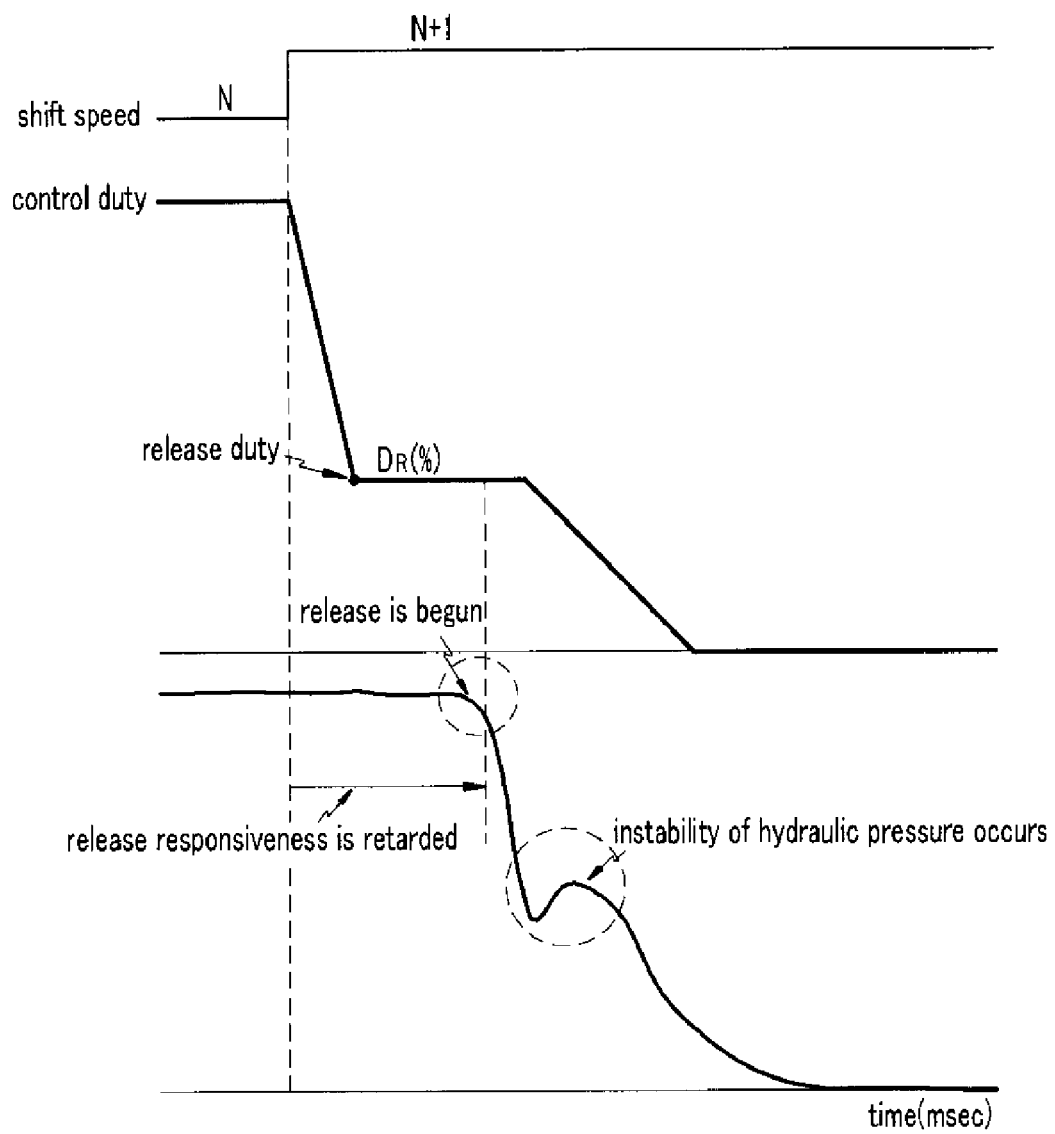
FIG. 6 is a graph showing control duty and hydraulic pressure of an off-going element in a case that shift is performed by a conventional method for releasing hydraulic pressure of an automatic transmission.

As shown in FIG. 3, if the transmission control unit 250 detects the shift signal, the transmission control unit 250 calculates a delay time $T_{PSW}$ at step S310. The delay time is a time during which the control duty of the solenoid valve PCV is maintained at 0%, and may be 10-30 ms such that the hydraulic pressure supplied to the off-going element is not quickly reduced. In addition, the delay time inversely relates to the oil temperature, and as shown in FIG. 5, the delay time that is predetermined as a function of the oil temperature is stored in the transmission control unit 250.

After the delay time Tpsw is calculated, the transmission control unit 250 resets a timer to 0 at step S320 and determines whether a time T of the timer is larger than the delay time (Tpsw) at step S330.

If the time T of the timer is not larger than the delay time, the transmission control unit 250 quickly reduces the control duty to 0% at step S350 and increases the time of the timer at step S360.

After that, the transmission control unit 250 determines whether a shift is completed at step S370. If the shift is not completed, the steps S330, S350, and S360 are repeated.

If the time T of the timer is larger than the delay time Tpsw at step S330 while the steps S330, S350, and S360 are repeated, the transmission control unit 250 increases the control duty to release duty $D_R$ at step S340 and controls release of the off-going elements according to a conventional control duty of the off-going elements.

After that, the transmission control unit 250 determines whether the shift is completed at step S370, and finishes the release control of the off-going element if the shift is completed.

Hereinafter, the method for releasing hydraulic pressure of an automatic transmission according to an exemplary embodiment of the present invention will be described in further detail with reference to FIG. 1 and FIG. 4.

Figure 4:
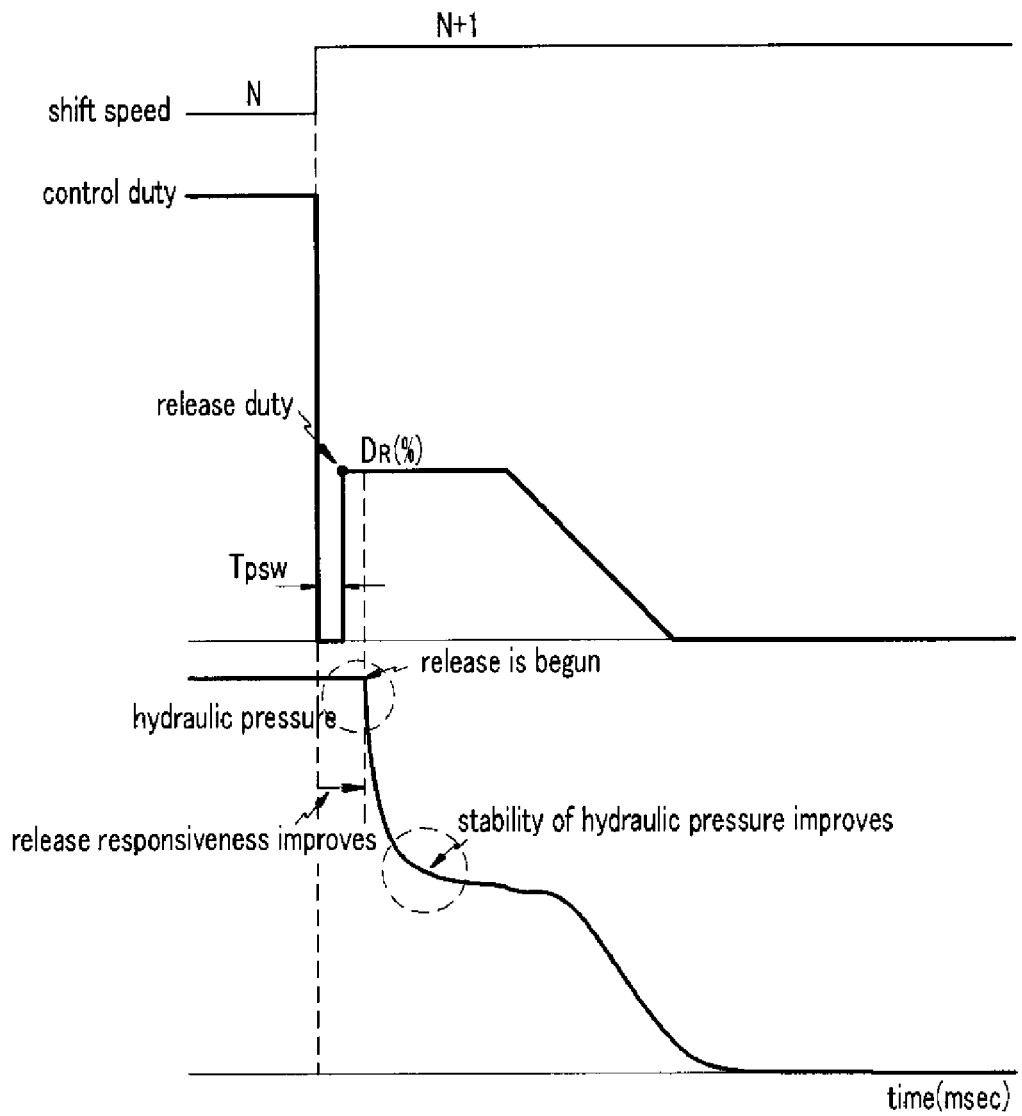
FIG. 4 is a graph showing control duty and hydraulic pressure of an off-going element in a case in which a shift is performed by a method for releasing hydraulic pressure of an automatic transmission according to an exemplary embodiment of the present invention.

FIG. 4 is a graph showing control duty and hydraulic pressure of an off-going element in a case in which a shift is performed by a method for releasing hydraulic pressure of an automatic transmission according to an exemplary embodiment of the present invention.

As shown in FIG. 1 and FIG. 4, the control duty of the solenoid valve PCV is maintained at 100% before the shift is begun. In this case, a valve spool of the pressure control valve 10 is moved to the left in the drawing by the control pressure of the solenoid valve PCV, and the operating pressure of the pressure control valve 10 is supplied to the pressure switch valve 12 and the switch valve 14.

The operating pressure supplied to the pressure control valve 12 is blocked at the third port 123 of the pressure control valve 12, and the operating pressure supplied to the switch valve 14 is supplied to the off-going element through the fail-safe valve 16.

If the transmission control unit 250 detects the shift signal at this state, the transmission control unit 250 quickly reduces the control duty of the solenoid valve PCV to 0%. In this case, the control pressure of the solenoid valve PCV is quickly reduced and the valve spool of the pressure control valve 10 is quickly moved to the right in the drawing. In addition, a valve spool of the pressure switch valve 12 is also moved to the right in the drawing by the reducing pressure. Therefore, the third and fourth ports 123 and 124 of the pressure switch valve 12 are communicated with each other, and the operating pressure supplied to the pressure switch valve 12 is supplied to the second port 102 of the pressure control valve 10 as the feedback pressure through the third and fourth ports 123 and 124.

After the feedback pressure is maintained during the delay time (the valve spool of the pressure control valve 10 is moved to the right in the drawing during the delay time), the transmission control unit 250 quickly recovers the control duty of the solenoid valve PCV to the release duty. At this time, the valve spool of the pressure control valve 10 is slowly moved to the right in the drawing by the control pressure of the solenoid valve PCV and the feedback pressure, and thereby stability of hydraulic pressure control may improve.

After that, the transmission control unit 250 reduces the control duty of the solenoid valve PCV to 0% according to a predetermined control pattern, and thereby the release of the off-going element is completed.

As described above, since control duty of an off-going solenoid valve is maintained at 0% during a delay time at an initial release stage of the off-going element and feedback pressure is quickly supplied to a pressure control valve, release responsiveness may improve.

In addition, since the feedback pressure is continuously supplied to the pressure control valve when hydraulic lines in the pressure switch valve are conversed, stability of hydraulic pressure control may improve.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for releasing hydraulic pressure of an automatic transmission, comprising:
    determining whether a shift signal is detected;
    calculating a delay time $T_{PSW}$ according to oil temperature;
    maintaining a control duty at 0% during the delay time; and
    recovering the control duty to a release duty $D_R$ after the delay time has passed.

2. The method of claim 1, further comprising:
    reducing the control duty to 0% according to a predetermined control pattern after step of recovering the control duty to the release duty $D_R$ after the delay time has passed.

3. The method of claim 1, wherein the delay time is predetermined as a function of the oil temperature.

4. A system for releasing hydraulic pressure of an automatic transmission, comprising:
    a detecting module detecting vehicle speed, throttle opening, turbine speed, and oil temperature in a transmission;

a transmission control unit generating a control duty based on the detected values transmitted from the detecting module, and calculating a delay time according to the oil temperature;

a solenoid valve generating a control pressure according to the control duty of the transmission control unit;

a pressure control valve controlled by the control pressure of the solenoid valve and a feedback pressure opposing thereto, and supplying an operating pressure;

a pressure switch valve controlled by the control pressure of the solenoid valve and a reducing pressure opposing thereto, and supplying a part of the operating pressure transmitted from the pressure control valve back to the pressure control valve as the feedback pressure; and a switch valve supplying the operating pressure transmitted from the pressure control valve to an off-going element.

5. The system of claim 4, wherein the transmission control unit quickly decreases the control duty to 0% when a shift signal is detected, and maintains the control duty at 0% during a delay time.

6. The system of claim 5, wherein the transmission control unit recovers the control duty to a release duty after the delay time has passed.

7. The system of claim 6, wherein the transmission control unit reduces the control duty to 0% according to a predetermined control pattern after recovering the control duty to the release duty $D_R$ after the delay time has passed.

8. The system of claim 5, wherein the delay time is predetermined as a function of the oil temperature.

* * * * *